United States Patent Office 3,018,262
Patented Jan. 23, 1962

3,018,262
CURING POLYEPOXIDES WITH CERTAIN METAL SALTS OF INORGANIC ACIDS
Carl W. Schroeder, Orinda, Calif., assignor to Shell Oil Company, a corporation of Delaware
No Drawing. Filed May 1, 1957, Ser. No. 656,187
8 Claims. (Cl. 260—29.2)

This invention relates to the curing of polyepoxides. More particularly, the invention relates to new processes for curing polyepoxides with certain metal salts of inorganic acids, and to the resulting cured products.

Specifically, the invention provides a new process for curing polyepoxides, i.e. materials possessing more than one vicepoxy group, which comprises contacting the polyepoxide with at least one salt of (1) a metal of the group consisting of zinc, magnesium, copper, aluminum, nickel, cadmium, cerium, strontium, calcium, iron, cobalt, chromium, mercury, beryllium, zirconium, lead, tin and selenium, and (2) an inorganic acid of the group consisting of sulfuric, sulfurous, persulfuric, fluoboric, fluoberyllic, nitric, boric, fluorosilicic, phosphoric, phosphorous, perchloric and chloric acid. The invention further provides cured products obtained by the above process.

As a special embodiment, the invention provides a process for curing polyepoxides while they are dispersed within the fibers of textile fabrics so as to form fabrics having improved crease and shrink resistance. This special process comprises impregnating the fabric with an aqueous medium containing the polyepoxide and a minor quantity of at least one of the above-described salts and then heating the treated fabric to a curing temperature for a short period. The invention further provides crease and shrink resistant textile fabrics prepared by this method.

This application is a continuation-in-part of application Serial No. 369,503, filed July 21, 1953, now abandoned.

It has recently been found that polyepoxides are promising materials for imparting crease and shrink resistance to textile fabrics. When the polyepoxides are applied to the fabric in the form of aqueous solutions or dispersions and then cured in the presence of curing agents at elevated temperatures, the resulting goods have a soft hand and excellent crease and shrink resistance. The polyepoxides are superior in this application to the crease- and shrink-proofing agents used heretofore, such as the urea-aldehyde type resins, in that they tend to give higher wrinkle recovery values, better washability and can be applied to white goods without fear of discoloration on bleaching and loss of strength on ironing.

One of the difficulties encountered in adapting this discovery to commercial use, however, has been to find a method for curing the polyepoxides that meets all the requirements of this special application. Many of the agents used heretofore for curing the polyepoxides cannot be utilized in this application as they have a deleterious effect on the physical properties of the fabric. Others of the known curing agents for the polyepoxides cannot be used as they tend to discolor the cloth or make the cloth more susceptible to scorch. Known nitrogen-containing agents such as the amines, are unsuited for this purpose as they tend to cause discoloration on bleaching. Still other known curing agents have too short a pot life and/or are unable to effect the cure of the polyepoxides within the short period allowed for the curing of the treated fabrics.

It is, therefore, an object of the invention to provide a new method for curing polyepoxides. It is a further object to provide a new class of curing agents for polyepoxides. It is a further object to provide new curing agents for polyepoxides that have a long pot life and can effect the cure in a short period at relatively low temperatures. It is a further object to provide a method for curing polyepoxides while dispersed within the fibers of textile fabrics to impart shrink and wrinkle resistance to the said fabrics. It is a further object to provide a method for curing polyepoxides while dispersed within the fibers of textile fabrics which give products having outstanding wrinkle recovery, excellent resistance to scorch and good laundering properties. It is a further object to provide curing agents for use in applying polyepoxides to textile fabrics which have little or no effect on the color or chlorine retentive properties of the treated fabric. Other objects and advantages of the invention will be apparent from the following detailed description thereof.

It has now been discovered that these and other objects may be accomplished by contacting the polyepoxide with at least one salt of (1) a metal of the group consisting of zinc, magnesium, copper, aluminum, nickel, cadmium, cerium, strontium, calcium, iron, cobalt, chromium, mercury, beryllium, lead, tin, zirconium and selenium, and (2) an inorganic acid of the group consisting of sulfuric, sulfurous, persulfuric, fluoboric, fluoberyllic, boric, nitric, fluosilicic, phosphoric, phosphorous, perchloric, and chloric acid.

It has been found that when these particular salts are added in small amounts to polyepoxides or compositions containing polyepoxides and the resulting mixture heated, the said mixtures readily set up to form hard resinous products. These salts are particularly valuable as curing agents for applying polyepoxides to textile fabrics as they are effective in aqueous medium, act to give a rapid cure of the polyepoxides within a short period allowed for the cure and give products which have properties which are better than those of the fabrics treated with other known curing agents. Treated fabrics prepared by the use of these special catalysts, for example, have improved resistance to shrinkage, outstanding wrinkle recovery, excellent resistance to scorch, excellent laundering properties and no chlorine retention. Evidence of the superior results obtained by the use of the above-noted salts as curing agents for this application can be found in the working examples at the end of the specification.

As noted, the special curing agents of the present invention comprise salts of metals of the group consisting of zinc, magnesium, copper, aluminum, nickel, cadmium, cerium, strontium, calcium, iron, cobalt, chromium, mercury, beryllium, zirconium, lead, tin and selenium, and (2) an inorganic acid of the group consisting of sulfuric, sulfurous, persulfuric, fluoboric, fluoberyllic, boric, nitric, fluosilicic, phosphoric, phosphorous, perchloric, and chloric acid. Examples of these salts include, among others, zinc fluoborate, copper fluoborate, magnesium fluoborate, aluminum fluoborate, nickel fluoborate, cadmium fluoborate, cerium fluoborate, strontium fluoborate, iron fluoborate, cobalt fluoborate, chromium fluoborate, mercury fluoborate, lead fluoborate, tin fluoborate and beryllium fluoborate, zinc sulfate, magnesium sulfate, copper sulfate, aluminum sulfate, nickel sulfate, cadmium sulfate, cerium sulfate, strontium sulfate, calcium sulfate, iron sulfate, cobalt sulfate, chromium sulfate, mercury sulfate, beryllium sulfate, tin sulfate and selenium sulfate, zinc sulfite, magnesium sulfite, copper sulfite, nickel sulfite, cerium sulfite, calcium sulfite, iron sulfite, cobalt sulfite, beryllium sulfite, tin sulfite, and selenium sulfite, copper persulfate, zinc persulfate, strontium persulfate, tin persulfate and cobalt persulfate, zinc nitrate, magnesium nitrate, copper nitrate, aluminum nitrate, cadmium nitrate, strontium nitrate, calcium nitrate, iron nitrate, cobalt nitrate, mercury nitrate, beryllium nitrate, lead nitrate, and tin nitrate, zinc fluoberyllate, magnesium fluoberyllate, iron fluoberyllate, strontium fluoberyllate, chromium fluoberyllate, zinc fluosilicate, copper fluosilicate, aluminum fluosilicate, chromium fluosilicate, cerium fluosilicate, selenium fluosilicate, zinc borate and aluminum borate, zinc phosphate, copper phosphate, magnesium phosphate, aluminum phosphate, nickel phosphate, cadmium phosphate, cerium phosphate, strontium phosphate, iron phosphate, cobalt phosphate, mercury phosphate and lead phosphate, zinc phosphite, mercury phosphite, copper phosphite, iron phosphite, zinc perchlorate, iron perchlorate, cobalt perchlorate, nickel perchlorate, zinc chlorate, iron chlorate, aluminum chlorate and tin chlorate. The salts may be in their anhydrous or hydrated form.

Particularly preferred are the salts made up of a weakly basic metal (e.g. ionization constant less than $1 \times 10^{-8}$) and a strong acid, such as the weakly basic salts of sulfuric and fluoboric acid. Especially preferred are the above-noted salts of sulfuric acid, fluoboric acid, perchloric acid and phosphoric acid.

The polyepoxides to be cured by the above-described metal salts are materials possessing more than 1 vic-epoxy group, i.e. more than one

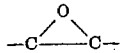

group. They may be aliphatic, cycloaliphatic, aromatic or heterocyclic and may be substituted if desired with non-interfering substituents, such as chlorine atoms, hydroxyl groups, ether radicals and the like. They may also be monomeric or polymeric.

For clarity, many of the polyepoxides and particularly those of the polymeric type will be described throughout the specification and claims in terms of an epoxy equivalency. The term "epoxy equivalency" refers to the average number of epoxy groups, (i.e.

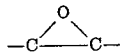

groups) contained in the average molecule. This value is obtained by dividing the average molecular weight of the polyepoxide by the epoxide equivalent weight. The epoxide equivalent is determined by heating a one gram sample of the polyepoxide with an excess of pyridinium chloride dissolved in pyridine. The excess pyridinium chloride is then back titrated with 0.1 N sodium hydroxide to phenolphthalein end point. The epoxide value is calculated by considering one HCl as equivalent to one epoxide group. This method is used to obtain all epoxide values reported herein.

If the polyepoxide material consists of a single compound and all of the epoxy groups are intact the epoxy equivalency will be integers, such as 2,3,4, and the like. However, in the case of polymeric-type polyepoxides many of the materials may contain some of the monomeric monoepoxides or have some of their epoxy groups hydrated or otherwise reacted and/or contain macromolecules of somewhat different molecular weight so the epoxy equivalency may be quite low and containing fractional values. The polymeric material may, for example, have an epoxy equivalency of 1.5, 1.8, 2.5, and the like.

The polyepoxides may be exemplified by the following: vinyl cyclohexene dioxide, epoxidized mono-, di- and triglycerides, butadiene dioxide, 1,4-bis(2,3-epoxypropoxy)benzene, 1,3-bis(2,3-epoxypropoxy)benzene, 4,4'-bis(2,3-epoxypropoxy)diphenyl ether, 1,8-bis(2,3-epoxypropoxy)octane, 1,4-bis(2,3-epoxypropoxy)cyclohexane, 4,4' - bis(2 - hydroxy - 3,4 - epoxybutoxy)diphenyldimethylmethane, 1,3-bis(4,5-epoxypentoxy)-5-chlorobenzene, 1,4-bis(3,4-epoxybutoxy)2-chlorocyclohexane, diglycidyl thioether, diglycidyl ether, ethylene glycol diglycidyl ether, resorcinol diglycidyl ether, 1,2,5,6-diepoxyhexyne-3, 1,2,5,6-diepoxyhexane, and 1,2,3,4-tetra(2-hydroxy-3,4-epoxybutoxy)butane.

Other examples include the glycidyl polyethers of polyhydric phenols obtained by reacting a polyhydric phenol with an excess, e.g., 4 to 8 mol excess, of a chlorohydrin, such as epichlorohydrin and diglycerol chlorohydrin. Thus, polyether B described hereinafter, which is substantially diglycidyl ether of 2,2-bis(2,3-epoxypropoxyphenyl)propane is obtained by reacting bis-phenol 2,2-bis(4-hydroxyphenyl)propane with an excess of epichlorohydrin in an alkaline medium. Other polyhydric phenols that can be used for this purpose include resorcinol, catechol, hydroquinone, methyl resorcinol, or polynuclear phenols, such as 2,2-bis(4-hydroxyphenyl)-butane, 4,4'-dihydroxybenzophenone, bis(4-hydroxyphenyl)ethane, and 1,5-dihydronaphthalene.

Still a further group of the polyepoxides comprises the polyepoxy polyethers obtained by reacting, preferably in the presence of an acid-acting compound, such as hydrofluoric acid, one of the aforedescribed halogen-containing epoxides with a polyhydric alcohol, and subsequently treating the resulting product with an alkaline component. Polyhydric alcohols that may be used for this purpose include glycerol, propylene glycol, ethylene glycol, diethylene glycol, butylene glycol, hexanetriol, sorbitol, mannitol, pentanetriol, pentaerythritol, di- and tripentaerythritol, polyglycerol, dulcitol, inositol, carbohydrates, methyltrimethylolpropane, 2,6-octanediol, 1,2,4,5-tetrahydroxycyclohexane, 2-ethylhexanetriol-1,2,6, glycerol methyl ether, glycerol allyl ether, polyvinyl alcohol and polyallyl alcohol, and mixtures thereof. Such polyepoxides may be exemplified by glycerol triglycidyl ether, mannitol, tetraglycidyl ether, pentaerythritol tetraglycidyl ether and sorbitol tetraglycidyl ether.

A further group of the polyepoxides comprises the polyepoxy polyesters obtained by esterifying a polycarboxylic acid with an epoxy-containing alcohol, such as, for example, the diglycidyl ester of adipic acid, the diglycidyl ester of malonic acid, and the diglycidyl ester of succinic acid.

Other polyepoxides include the polyepoxypolyhydroxy polyethers obtained by reacting, preferably in an alkaline medium, a polyhydric alcohol or polyhydric phenol with a polyepoxide, such as the reaction product of glycerol and bis(2,3-epoxypropyl)ether, the reaction product of sorbitol and bis(2,3-epoxy-2-methylpropyl)ether, the reaction product of pentaerythritol and 1,2-epoxy-4,5-epoxypentane, and the reaction product of bis-phenol and bis(2,3-epoxy-2-methylpropyl)ether, the reaction product of resorcinol and bis(2,3-epoxypropyl)ether, and the reaction product of catechol and bis(2,3-epoxypropyl)ether.

A group of polymeric-type polyepoxides comprises the hydroxy-substituted polyepoxy polyethers obtained by reacting, preferably in an alkaline medium, a slight excess, e.g., .5 to 3 mol excess, of a halogen-containing epoxide as described above, with any of the aforedescribed polyhydric phenols, such as resorcinol, catechol, bis-phenol, bis [4-(2'-hydroxynaphth-1-yl)-2-2-hydroxynaphth-1-yl] methane and the like.

Other polymeric polyepoxides include the polymers and copolymers of the epoxy-containing monomers possessing at least one polymerizable ethylenic linkage. When this type of monomer is polymerized in the substantial absence of alkaline or acidic catalysts, such as in the presence of heat, oxygen, peroxy compounds, actinic light, and the like, they undergo addition polymerization at the multiple bond leaving the epoxy group unaffected. These monomers may be polymerized with themselves or with other ethylenically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, 2-chloroallyl acetate, and vinyl methallyl pimelate. Illustrative examples of these polymers include poly(allyl 2,3-epoxypropyl ether), poly(2,3-epoxypropyl crotonate), allyl 2,3-epoxypropyl ether-styrene copolymer, methallyl 3,4-epoxybutyl ether-allyl benzoate copolymer, poly(vinyl 2,3-epoxypropyl)ether, allyl glycidyl ether-vinyl acetate copolymer and poly [4-(2′,3′-glycidyloxy)-styrene].

Preferred polyepoxides comprise the members of the group consisting of diglycidyl ether, diglycidyl theioether, monomeric aliphatic polyepoxides containing a plurality of glycidyl radicals joined through oxygen or sulfur ether linkages to aliphatic hydrocarbon radicals, monomeric aromatic polyepoxides containing a plurality of glycidyl radicals joined through oxygen or sulfur ether linkages to mononuclear or polynuclear aromatic radicals, the polyepoxy-containing reaction product of an aliphatic polyhydric alcohol and epichlorohydrin, the polyepoxy polyesters obtained from polycarboxylic acids and epoxy-containing alcohols, the polyepoxy-containing polymeric reaction product of an aromatic polyhydric phenol and epichlorohydrin, the polyepoxy-containing reaction product of an aliphatic polyhydric alcohol and a polyepoxy compound, the polyepoxy-containing reaction product of a polyhydric phenol and a polyepoxide compound, the polymers of epoxy-containing monomers possessing at least one polymerizable ethylenic linkage prepared in the absence of alkaline or acidic catalysts, and copolymers of the aforedescribed epoxy-containing monomers and at least one monomer-containing a $CH_2=C=$ group prepared in the absence of alkaline or acidic catalysts.

Coming under special consideration, particularly if the polyepoxide is to be used in the treatment of textile fabrics, are the polyglycidyl polyethers of polyhydric alcohols obtained by reacting the polyhydric alcohol with epichlorohydrin, preferably in the presence of 0.1% to 5% by weight of an acid-acting compound, such as boron trifluoride, hydrofluoric acid, stannic chloride or stannic acid. This reaction is effected at about 50° C. to 125° C. with the proportions of reactants being such that there is about one mole of epichlorohydrin for every equivalent of hydroxyl group in the polyhydric alcohol. The resulting chlorohydrin ether is then dehydrochlorinated by heating at about 50° C. to 125° C. with a small, e.g., 10% stoichiometrical excess of a base, such as sodium aluminate.

The products obtained by the method shown in the preceding paragraph may be described as halogen-containing ether epoxide reaction mixtures and products are polyether polyepoxide reaction products which in general contain at least three non-cyclic ether (—O—) linkages, terminal epoxy-containing ether

groups, and halogen attached to a carbon of an intermediate

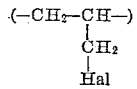

group.

These halogen-containing polyether polyepoxide reaction products, obtainable by partial dehydrohalogenation of polyhalohydrin alcohols may be considered to have the following general formula

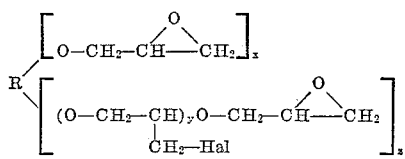

in which R is the residue of the polyhydric alcohol which may contain unreacted hydroxyl groups, X indicates one or more of the epoxy ether groups attached to the alcohol residue, y may be one or may vary in different reaction products of the reaction mixture from zero to more than one, and Z is one or more, and $X+Z$, in the case of products derived from polyhydric alcohols containing three or more hydroxyl groups, averages around two or more so that the reaction product contains on the average two or more than two terminal epoxide groups per molecule.

The preparation of one of these preferred polyglycidyl ethers of polyhydric alcohols may be illustrated by the following example showing the preparation of a glycidyl polyether of glycerol.

PREPARATION OF GLYCIDYL POLYETHERS OF POLYHYDRIC ALCOHOLS

*Polyether A.*—About 276 parts (3 mols) of glycerol was mixed with 832 parts (9 mols) of epichlorohydrin. To this reaction mixture was added 10 parts of diethyl ether solution containing about 4.5% boron trifluoride. The temperatures of this mixture was between 50° C. and 75° C. for about three hours. About 370 parts of the resulting glycerol-epichlorohydrin condensate was dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 150° C. at 20 mm. pressure. The polyglycidyl ether, in amount of 261 parts, was a pale yellow, viscous liquid. It had an epoxide value of 0.871 equivalents per 100 grams and the molecular weight was 324 as measured ebullioscopically in dioxane solution. The epoxy equivalency of this product was 2.13. For convenience, this product will be referred to hereinafter as polyether A.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products preferably have an epoxy equivalency greater than 1.0, and still more preferably between 1.1 and 4 and a molecular weight between 170 and 900.

Also of importance are the monomeric and polymeric glycidyl polyethers of dihydric phenols obtained by reacting epichlorohydrin with a dihydric phenol in an alkaline medium. The monomeric products of this type may be represented by the general formula

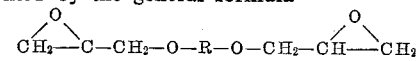

wherein R represents a divalent hydrocarbon radical of the dihydric phenol. The polymeric products will generally not be a single simple molecule but will be a complex mixture of glycidyl polyethers of the general formula

wherein R is a divalent hydrocarbon radical of the dihydric phenol and n is an integer of the series 0, 1, 2, 3, etc. While for any single molecule of the polyether n is an integer, the fact that the obtained polyether is a mixture of compounds causes the determined value of n to be an average which is not necessarily zero or a whole number. The polyethers may in some cases contain a very small amount of material with one or both of the terminal glycidyl radicals in hydrated form.

The aforedescribed preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

The preparation of some of the glycidyl polyethers of the dihydric phenols will be illustrated below.

PREPARATION OF GLYCIDYL POLYETHERS OF DIHYDRIC PHENOLS

*Polyether B.*—About 2 mols of bis-phenol was dissolved in 10 mols of epichlorohydrin and 1 to 2% water added to the remaining mixture. The mixture was then brought to 80° C. and 4 mols of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal amount of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value of 0.50 eq./100 g., and an epoxy equivalency of 1.75. For convenience, this product will be referred to hereinafter as polyether B.

*Polyether C.*—A solution consisting of 11.7 parts of water, 1.22 parts of sodium hydroxide and 13.38 parts of bis-phenol was prepared by heating the mixture of ingredients to 70° C. and then cooling to 46° C. at which temperature 14.06 parts of epichlorohydrin was added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water at 20° C. to 30° C. temperature was started 30 minutes later and continued for 4½ hours. The product was dried by heating to a final temperature of 140° C. in 80 minutes and cooled rapidly. At room temperature, the product was an extremely viscous semi-solid having a melting point of 27° C. by Durrans' Mercury Method and a molecular weight of 483. The product had an epoxy value of 0.40 eq./100 g., and an epoxy equivalency of 1.9. For convenience, this product will be referred to as polyether C.

*Polyether D.*—About 228 parts of bis-phenol and 84 parts sodium hydroxide as a 10% aqueous solution were combined and heated to about 45° C. whereupon 176 parts of epichlorohydrin was added rapidly. The temperature increased and remained at about 95° C. for 80 minutes. The mixture separated into a two-phase system and the aqueous layer is drawn off. The resinous layer that remained is washed with hot water and then drained and dried at 130° C. The Durran's Mercury Method melting point of the resulting product is 52° C. and the molecular weight is about 710. The product has an epoxy value of 0.27 eq./100 g. and an epoxy equivalency of 1.9. For convenience, this product will be referred to as polyether D.

Particularly preferred members of the above-described group are the glycidyl polyethers of the dihydric phenols, and especially 2,2-bis(4-hydroxyphenyl)propane, having an epoxy equivalency between 1.1 and 2.0 and a molecular weight between 300 and 900. Particularly preferred are those having a Durrans' Mercury Method softening point below about 60° C.

The glycidyl polyethers of polyhydric phenols obtained by condensing the polyhydric phenols with epichlorohydrin are also referred to as "ethoxyline" resins. See Chemical Week, vol. 69, page 27, for September 8, 1951.

Of particular value in the process of the invention are the polyepoxides containing only carbon, hydrogen, oxygen and halogen atoms.

The curing of the polyepoxides is effected by admixing and commingling the above-described metal salts with the polyepoxide. In most instances, curing occurs at a temperature above about 30° C. and preferably about 50° C., but a more rapid rate of cure may be obtained by using higher temperatures such as those of the order of 90° C. to 200° C.

If the polyepoxide compositions are to be used in the preparation of coating compositions, impregnation of cloth, etc., it may be desirable in some cases to use a special procedure wherein the polyepoxide composition is applied and then simultaneously or subsequently spraying a solution of the salt on to the material treated with the polyepoxide.

To effect the cure, it is generally desirable to add the salt in amounts varying from about .1% to 30% by weight based on the weight of the polyepoxide. Particularly preferred amounts vary from 1% to 5% by weight of the polyepoxide.

Although not essential, it is generally preferred to effect the mixing of the curing catalyst with the polyepoxide in water or a suitable solvent. Solvents that may be used are those which dissolve the polyepoxides, such as acetone, methyl ethyl ketone, isophorone, ethyl acetate, butyl acetate, cellusolve acetate, ethyl alcohols, such as methyl, ethyl or butyl ether of ethylene glycol, chlorinated solvents, such as trichloropropane, chloroform, etc. To save expense, sometimes these active solvents are used in admixture with diluents which are themselves not solvents when used alone but which may be incorporated with the active solvent. Materials of this type may be exemplified by benzene, toluene, xylene, aromatic petroleum thinner, etc., and alcohols as ethyl alcohol, butyl alcohol and the like.

When used as film-forming materials, the compositions containing the polyepoxide and curing catalyst may contain various other materials, such as pigments, plasticizers and other resins.

The catalysts of the present invention show their highest activity in mediums which are acidic and preferably those having a pH of 2 to 5. The pH may be adjusted to the desired level by adding materials, such as tertiary amines, and the like.

As indicated above, the curing catalysts are especially added for use in preparing of shrink and wrinkle proof cloth. This may be accomplished by applying the polyepoxides in an aqueous solution or dispersion onto the fabric and then curing the fabric at relatively high temperatures. The catalyst may be applied with the solution of the polyepoxide, or, as indicated above, it may be sprayed or otherwise applied afterwards or during the curing period.

The polyepoxides may be applied in an aqueous solution, such as mixtures of water and solvents as acetone, ethyl alcohol, dioxane, esters, ethers, etc., or in an aqueous emulsion. Emulsifying agents employed for this purpose are preferably those that are free of nitrogen and strong acidic groups, such as the monooleate of sorbitan polyoxyethylene, the trioleate of sorbitan polyoxyethylene, sorbitan tristearate, sorbitan monolaurate, polyoxyethylene esters of alkylphenols, carboxymethylcellulose, starch, gum arabic, polyvinyl alcohol, aryl and alkylated aryl sulfonates, such as cetyl sulfonate, oleyl sulfonate, sulfonated mineral oils, copolymers of vinyl methyl ether, maleic anhydride and the like, and mixtures thereof. The emulsifying agents are generally employed in amounts varying from 0.1% to 10% by weight and more preferably from 1% to 5% by weight.

The amount of the polyepoxide in the impregnating solution may vary over a considerable range depending chiefly on the amount of resin to be deposited on the fabric and this in turn will depend on the number of applications and the pick-up allowed per application. When the solution is applied but once, with a 65% to 100% pick-up by weight of the fabric in the dry state, a concentration ranging from 3% to 25% by weight will ordinarily suffice. If less than 65% pick-up is permitted, the concentration may in some cases go as high as 30% to 50%.

The solutions employed to treat the textiles may also contain plasticizers to improve their flexibility, although these should not be present in such proportions as to render the finished materials soft or sticky at temperatures and humidities to which they would be so exposed. It is found, however, that the substances employed in the present invention yield products which are sufficiently flexible for most purposes wthout the use of plasticizers. Among plasticizers that may be used according to the present invention may be mentioned organic and inorganic derivatives of phenols, for example, diphenylol propane and triphenyl and tricresyl phosphates, sulphonamides, alkyl phthalates, for example, diethyl phthalate and glycol phthalates, diethyl tartrate, derivatives of polyhydric alcohols, for example, mono-, di- and tri-acetin, and products obtained by condensing polyhydric alcohols with themselves or with aldehydes or ketones. The compositions may also contain natural resins, e.g., shellac, resin, and other natural resins and synthetic or semi-synthetic resins, e.g., ester gum, polyhydroxy-polybasic alkyd resins, phenol aldehyde and urea-aldehyde resins.

Textile softening agents may also be added in varying amounts to improve the feel of the treated fabrics. Examples of these agents include, among others, epoxidized glycerides, such as epoxidized soybean oil, glycidyl deltadecyl ether, pentadecyl phenol, octodecyl succinic acid, octodecenyl succinic acid, sulfonated waxes and sulfonated alcohols, dimerized long-chain unsaturated acids, non-ionic fatty acid esters of higher polyglycols. Preferred softeners are the epoxidized tri- and di-glycerides.

The application of the solution containing the polyepoxide to the textile fabric may be effected in any suitable manner, the method selected depending upon the results desired. If it is desired to apply the solution only to one surface of the material, as, for example, when it is desired to treat the back only of a fabric having a face of artificial or natural silk and a cotton back, the application may be effected by spraying or by means of rollers, or the composition may be spread upon the surface by means of a doctor blade. When, however, it is desired to coat both surfaces of the material, or if the material is to be thoroughly impregnated with it, the fabrics may be simply dipped in the solution or run through conventional-type padding rollers. The solutions may also be applied locally to the material, for example, by means of printing rollers or by stencilling.

The amount of the polyepoxides to be deposited on the fabric will vary over a wide range depending upon the degree of wrinkle-resistance and shrink-resistance desired in the finished material. If the fabric is to have a soft feel, such as that intended for use for dresses, shirts, etc., the amount of polyepoxide deposited will generally vary from 3% to 20% by weight of the fabric. If stiffer materials are required such as for shoe fabrics, draperies, etc., still higher amounts of resins, such as of the order of 25% to 50% by weight may be deposited. In determining the amount of resin deposited, it should, of course, be remembered that the presence of the polyexpoxides in a few instances causes a slight decrease in tear strength of the fabric and the amount deposited should be balanced between the desired wrinkle resistance and the desired tear strength.

If the desired amount of the polyepoxide deposited in the fabric is not obtained in one application. the solution can be applied again or as many times as desired in order to bring the amount of the polyepoxide up to the desired level.

After the desired amount of solution has been applied to the fabric, the treated fabric is preferably dried for a short period to remove some or all of the dispersing liquid, such as water, alcohol, and the like. This is generally accomplished by exposing the wet sheets to hot gas either slack or framed to dimension at temperatures ranging up to 120° C. The period of drying will depend largely on the amount of pick-up permitted during the application of the solution, and the concentration of the polyepoxide. In most instances, drying periods of from 1 to 30 minutes should be sufficient.

The dried fabric is then exposed to relatively high temperatures to accelerate the cure of the polyepoxides. Temperatures used for this purpose generally range from 100° C. to 200° C., and more preferably from 130° C. to 190° C. At these preferred temperature ranges the cure can generally be accomplished in from 1 to 10 minutes. Exposures of less than 3 minutes, e.g., 1 minute, may probably be used in continuous, commercial processing.

The process of the invention may be applied to the treatment of any textile fabric. Such materials include the natural or artificial textile materials, such as cotton, linen, natural silk and artificial silk, such as the artificial silk obtained from cellulose acetate or other organic esters of ethers of cellulose and the regenerated cellulosic type of artificial silk obtained by the viscose, cuprammonium or nitrocellulose process, jute, hemp, rayon, animal fibers, such as wool hair, mohair, and the like, and mixtures thereof. While the invention has been particularly described with relation to the treatment of woven fabrics, it may also be applied to other materials, for example, knitted or netted fabrics.

The materials treated according to the process of the invention will have excellent wrinkle and shrink resistance as well as good resiliency and flexibility and may be used for a wide variety of important applications. The woven cotton, rayon and wool fabrics, both colored and white, containing conventional amounts of resin, e.g., from 3% to 25% by weight, may be used, for example, in the preparation of soft goods, such as dresses, shirts, coats, sheets, handkerchiefs, and the like, while the fabrics containing much larger amounts of the resin, e.g., 25% to 50% may be used in other applications demanding more crispness and fullness such as the preparation of rugs, carpets, plushes, drapes, upholsteries, shoe fabrics, and the like.

To illustrate the manner in which the invention may be carried out, the following examples are given. It is to be understood, however, that the examples are for the purpose of illustration and the invention is not to be regarded as limited to any of the specific materials or conditions recited therein.

The wrinkle recovery values reported in some of the examples were determined by the Monsanto wrinkle recovery method, and the tear strength values were determined by the trapezoid method—ASTM D-39-49. All tests were carried out at 65% relative humidity and 70° F.

Unless otherwise indicated, parts disclosed in the examples are parts by weight.

*Example 1*

This example illustrates the use of zinc fluoborate as a curing agent for polyether A (prepared as shown above) in the preparation of wrinkle and shrink resistant cotton cloth.

The zinc fluoborate used in this experiment was prepared by adding zinc hydroxide to a 46% fluoboric acid solution.

(a) About 100 parts of polyether A was added to an acidic solution containing 540 parts water, .25 part methocell, 1.8 parts of a copolymer of vinyl methyl ether and maleic anhydride and .5 part of polyglycol fatty acid ester, and as the curing agent 5 parts of zinc fluoborate.

5.6 yd./lb. cotton gingham (about 80 x 70 count) cloth was then impregnated with the above-described solution by means of a Butterworth-3-roll laboratory padder. The cloth after padding showed a 65% wet pick-up. The impregnated cloth was then dried at 60° C. for 5 minutes and cured at 160° C. for 5 minutes. The finished product was then washed in a 0.13% solution of Ivory Flakes and 0.065% Na₂CO₃ solution at 70° C. for 12 minutes and then rinsed three times in warm water to remove any soluble materials.

The cloth treated in the above-described manner had the same color as before being subjected to the treatment, had a soft feel excellent crease and shrink resistance, good washability and no chlorine retention.

The wrinkle recovery (average warp and fill) of the cloth subjected to the above-noted 5-minute curing period is shown below in comparison to a similar sheet padded with polyether A cured with citric acid, a sheet padded with a commercial urea-formaldehyde resin and an unpadded sheet.

TABLE I

| Resin and Catalyst | Percent Resin Pick-up | Monsanto Wrinkle Recovery—Average Warp and Fill |
|---|---|---|
| Polyether A Zinc Fluoborate | 10 | 125.5 |
| Polyether A Citric Acid | 10 | 108 |
| Urea-Formaldehyde Resin | 6.20 | 107 |
| Blank (no resin) | | 84 |

The high wrinkle recovery value shown above for the sheet cured with the zinc fluoborate demonstrates the rapid rate of cure that is obtained with the zinc fluoborate in the 5-minute curing period in comparison to the cure obtained with the citric acid curing agent during the same period. The above values also demonstrate the excellent wrinkle recovery that can be imparted to the cloth by the polyether A zinc fluoborate combination in comparison to the values obtained by using the commercial urea-formaldehyde resins.

(b) Sections of the sheets treated as shown above with the polyether A and zinc fluoborate, polyether A and citric acid curing agent and sheets of the untreated cloth were placed in a scorch meter and maintained at 400° F. for 30 seconds. The sheets were then removed and examined for discoloration. The untreated sheets showed only very slight scorch, the sheets treated with the polyether A and zinc fluoborate had only slight scorch while the sheets treated with polyether A and citric acid had considerable scorch.

(c) The outstanding pot life of the polyepoxide-zinc fluoborate combination is shown in the following experiment. An aqueous solution containing 100 parts of polyether A, .25 part methocell, 1.8 parts of a copolymer of vinyl methyl ether and maleic anhydride and .5 part of a polyglycol fatty acid ester and 5 parts of zinc fluoborate was prepared and a portion of the solution immediately applied to cloth as shown in (a) above. The wrinkle recovery value of the cured sheet was 135. The remaining portion of the mixture was then allowed to stand for 24 hours and then applied to cloth as shown in (a) above. The cured sheet in this case still had a high wrinkle recovery value of 122.5 with a blank (no resin applied) of 84.

A similar aqueous solution was made up wherein the 5 parts of zinc fluoborate was replaced by 5 parts of citric acid. A portion of this solution was immediately applied to cloth as shown in (a) above. The wrinkle recovery value of the cured sheet was 112. The remaining portion of this mixture was then allowed to stand for six hours and then applied to cloth as shown in (a) above. The cured sheet in this case had a wrinkle recovery value of 85 with a blank of 84.

The above results thus indicate that while in the case of the zinc fluoborate the polyepoxide-curing agent mixture was still highly active at the end of a 24-hour period, the citric acid-polyepoxide mixture was almost completely inactive at the end of 6 hours.

(d) The following experiment demonstrates the improved washability of the treated cloth obtained by using the zinc fluoborate as the curing agent. Samples of the fabrics treated with polyether A and zinc fluoborate, polyether A and citric acid, and the urea-formaldehyde resin in (a) above were washed at 70° C. for 12 minutes using a 0.13% solution of Ivory Flakes and .065% Na₂CO₃ and then dried. The loss in weight due to the washing was then determined for each sample. As shown in the following table, the sheet treated with the polyether A-zinc fluoborate showed a much lower loss in weight due to washing than the other samples.

TABLE II

| Resin and Catalyst | Percent Loss in Weight |
|---|---|
| Polyether A-Zinc Fluoborate | 8.1 |
| Polyether A-Citric Acid | 24 |
| Urea-Formaldehyde Resin | 20 |

*Example II*

A series of impregnating solutions containing polyether A and a variety of different salts as curing agents was prepared in the following manner: 100 parts of polyether A was added to an aqueous solution containing 540 parts of water, .25 part methocell, 1.8 parts of a copolymer of vinyl methyl ether and maleic anhydride and .5 part of a polyglycol fatty acid ester, and 5 parts of the curing agent.

Sheets of cotton print cloth were then impregnated with the individual solutions as indicated in Example I to give about a 10% resin pick-up. The sheets were dried at 60° C. for 5 to 15 minutes and then cured at 160° C. for five minutes. The wrinkle recovery values of the sheets are shown in the table below:

TABLE III

| Catalyst | Monsanto Wrinkle Recovery—Average Warp and Fill |
|---|---|
| Magnesium Fluoborate | 120 |
| Mercury Fluoborate | 114 |
| Copper Fluoborate | 128 |
| Cadmium Fluoborate | 106 |
| Lead Fluoborate | 112 |
| Aluminum Fluoborate | 117 |
| Calcium Fluoborate | 103 |
| Cobaltous Fluoborate | 125 |
| Nickel Fluoborate | 107 |
| Tin Fluoborate | 107 |
| Untreated Cloth | 84 |
| Selenium Fluoborate | 130 |
| Strontium Fluoborate | 123 |

*Example III*

A series of impregnating solutions containing polyether A, zinc fluoborate and a variety of different softening agents was prepared in the following manner: 100 parts of polyether A was added to an aqueous solution containing 540 parts of water, .25 part methocell, 1.8 parts of a copolymer of vinyl methyl ether and maleic anhydride, .5 part of a polyglycol fatty acid ester, 5 parts of the zinc fluoborate and 25 parts of the softening agent.

Sheets of cotton print cloth were then impregnated with the individual solutions as indicated in Example I to give about a 10% resin pick-up. The sheets were dried at 60° C. for 5 to 15 minutes and then cured at 160° C. for 5 minutes. The wrinkle recovery values and the trapezoid tear strengths of the sheets are shown in the table below:

TABLE IV

| Exp. No. | Softener | Parts of Softener/ 100 parts Polyether | Monsanto Wrinkle Rec.—Avg. Warp and Fill | Trapezoid Tear Strength, Lbs. |
|---|---|---|---|---|
| I | None | | 112 | 1.8 |
| | Silicone (Rain Rem) | 5 | 121.5 | 2.0 |
| | Glycidyl delta-decyl ether | 5 | 119.5 | 1.9 |
| II | None | | 122.5 | 1.55 |
| | Pentadecyl phenol | 7.5 | 121 | 1.60 |
| | Glycidyl delta-decyl ether | 7.5 | 125.5 | 1.75 |
| III | None | | 127.5 | 1.45 |
| | Epoxidized soybean oil | 7.5 | 133 | 1.65 |
| | Octadecyl succinic acid | 7.5 | 125 | 1.80 |
| | Octadecenyl succinic acid | 7.5 | 135.5 | 1.60 |
| | Hydrogenated dimeric long-chain fatty acid | 7.5 | 123 | 1.55 |
| | Mixture of sulfonated waxes and sulfated alcohols (Atanol B.S.) | 7.5 | 129 | 1.8 |
| | Non-ionic fatty acid esters of higher polyglycols (Nonisol 300) | 7.5 | 122 | 1.6 |

*Example IV*

About 5 parts of lead fluoborate was added to 100 parts of a glycidyl polyether obtained by reacting epichlorohydrin with 2-hydroxyethoxymethyl-2,4-dimethyl pentanediol-1,5 (Triol 230), having an epoxy value of .549 eq./100 g. and a molemular weight of 376. Films of the resulting mixture were spread on glass plates and baked in an oven at 150° C. for 5 minutes. At the end of the baking period, the composition had set to a clear, hard film.

*Example V*

About 5 parts of cadmium fluoborate was added to 100 parts of polyether B (prepared as shown above). Films of the resulting mixture were formed on glass plates and then baked in an oven at 150° C. for 5 minutes. At the end of the baking period, the composition had set to a clear, hard film.

*Example VI*

About 5 parts of copper fluoborate was added to 100 parts of polyether B (prepared as shown above). Films of this mixture were then cast on glass plates and the plates placed in an oven at 150° C. for 5 minutes. At the end of the baking period, the composition had set to a hard, flexible film.

*Example VII*

Example I(a) was repeated with the exception that 8.1 parts of $Al_2(SO_4)_3 \cdot 18H_2O$ was used in place of the zinc fluoborate. Cotton cloth treated in this manner was non-chlorine retentive and had a crease recovery of 130.

*Example VIII*

Example I(a) was repeated with the exception that 4.62 parts of $BeSO_4 \cdot 4H_2O$ was used in place of the zinc fluoborate. Cotton cloth treated in this manner was non-chlorine retentive and had a crease recovery of 129.

*Example IX*

Example I(a) was repeated with the exception that 16.8 parts of zinc sulfate was used in place of the zinc fluoborate. Cotton cloth treated in this manner was non-chlorine retentive and had a high crease recovery and good shrink resistance.

*Example X*

Example I(a) was repeated with the exception that 13.0 parts of $CaSO_4 \cdot 5H_2O$ was used in place of the zinc fluoborate. Cotton cloth treated in this manner was non-chlorine retentive and had a crease recovery of 117 and good shrink resistance.

*Example XI*

Example I(a) was repeated with the exception that 10.0 parts of $FeSO_4 \cdot 7H_2O$ was used in place of the zinc fluoborate. Cotton cloth treated in this manner was non-chlorine retentive and had a crease recovery of 120 and good shrink resistance.

*Example XII*

Example I(a) was repeated with the exception that 5.0 parts of cerium sulfate was used in place of the zinc fluoborate. Cotton cloth treated in this manner was non-chlorine retentive and had good crease recovery and good shrink resistance.

*Example XIII*

Example I(a) was repeated with the exception that 10 parts of aluminum nitrate was used in place of the zinc fluoborate. Cotton cloth treated in this manner was non-chlorine retentive and had good crease resistance and good shrink resistance.

*Example XIV*

Example I(a) was repeated with the exception that 20 parts of calcium phosphate was used in place of the zinc fluoborate. Cotton cloth treated in this manner was non-chlorine retentive and had a crease recovery of 118.

*Example XV*

Example I(a) was repeated with the exception that 3.5 parts of copper fluosilicate was used in place of the zinc fluoborate. Cotton cloth treated in this manner was non-chlorine retentive and had good crease and shrink resistance.

*Example XVI*

Example I(a) was repeated with the exception that 12 parts of zinc perchlorate was used in place of the zinc fluoborate. Cotton cloth treated in this manner was non-chlorine retentive and had good crease resistance.

*Example XVII*

Example I(a) was repeated with the exception that 5.0 parts of zinc fluosilicate was used in place of the zinc fluoborate. Cotton cloth treated in this manner was non-chlorine retentive and had good crease and shrink resistance.

*Example XVIII*

Example I(a) was repeated with the exception that 20 parts of zinc phosphate was used in place of the zinc fluoborate. Cotton cloth treated in this manner was non-chlorine retentive and had a crease recovery value of 120.

*Example XIX*

Example I(a) was repeated with the exception that 15 parts of zirconium sulfate was used in place of the zinc fluoborate. Cotton cloth treated in this manner was non-chlorine retentive and had good crease and shrink resistance.

*Example XX*

Example I(a) was repeated with the exception that nickel fluosilicate is used in place of the zinc fluoborate. Cotton cloth treated in this manner was non-chlorine retentive and has good crease and shrink resistance.

*Example XXI*

Example I(a) was repeated with the exception that mercury fluosilicate is used in place of the zinc fluoborate. Cotton cloth treated in this manner was non-chlorine retentive and has good crease and shrink resistance.

*Example XXII*

About 5 parts of lead phosphate is added to 100 parts of polyether B. This mixture is cast on glass plates and placed in an oven at 150° C. for 10 minutes. At the end of that time, the film has set to a hard tough coating.

Example XXIII

About 10 parts of chromium sulfite is added to 100 parts of polyether B. This mixture is cast on glass plates and placed in an oven at 150° C. for 10 minutes. At the end of that time, the film has set to a hard tough coating.

Example XXIV

About 10 parts of cobalt nitrate is added to 100 parts of polyether B. This mixture is cast on glass plates and placed in an oven at 150° C. for 10 minutes. At the end of that time, the film has set to a hard tough coating.

Example XXV

About 5 parts of zinc sulfite is added to 100 parts of polyether A. This mixture is cast on glass plates and placed in an oven at 150° C. for 10 minutes. At the end of that time, the film has set to a hard tough coating.

Example XXVI

About 5 parts of zinc persulfate is added to 100 parts of polyether A. This mixture is cast on glass plates and placed in an oven at 160° C. The resulting film is a hard tough coating.

Example XXVII

About 10 parts of copper borate is added to 100 parts of polyether A. This mixture is cast on glass plates and placed in an oven at 150° C. for 10 minutes. At the end of that time, the film has set to a hard tough coating.

Example XXVIII

About 5 parts of zinc phosphite is added to 100 parts of polyether B. This mixture is cast on glass plates and placed in an oven at 150° C. for 10 minutes. At the end of that time, the film has set to a hard tough coating.

Example XXIX

About 10 parts of aluminum phosphite is added to 100 parts of polyether B. This mixture is cast on glass plates and placed in an oven at 150° C. for 10 minutes. At the end of that time, the film has set to a hard tough coating.

Example XXX

About 7.5 parts of zinc chlorate is added to 100 parts of polyether A. This mixture is cast on glass plates and placed in an oven at 150° C. for 10 minutes. At the end of that time, the composition has set to a hard coating.

Example XXXI

Example I(a) is repeated with the exception that magnesium nitrate is used in place of the zinc fluoborate. Cotton cloth treated in this manner has good crease and shrink resistance.

Example XXXII

About 5 parts of zinc fluoberyllate is added to 100 parts of polyether B. This mixture is then cast on glass plates and the plates placed in an oven at 150° C. for 10 minutes. At the end of that time, the composition had set to a hard tough coating.

Example XXXIII

About 5 parts of beryllium sulfate is added to 100 parts of polyether B. This composition is cast on glass plates and the plates placed in an oven at 150° C. for 10 minutes. At the end of that time, the composition has set to a hard film.

Example XXXIV

About 5 parts of aluminum fluoberyllate is added to 100 parts of polyether B. This mixture is cast on glass plates and placed in an oven at 150° C. for 10 minutes. At the end of the baking period, the composition has set to a hard film.

Example XXXV

About 5 parts of iron phosphite is added to 100 parts of polyether B and baked on glass plates as in the preceding example. The resulting coating is hard and tough.

Example XXXVI

About 5 parts of aluminum chlorate is added to 100 parts of polyether B and the mixture used to coat glass as in the preceding example. The resulting film is hard and tough.

Example XXXVII

About 5 parts of lead fluoberyllate is added to 100 parts of polyether B. This mixture is cast on glass plates and baked at 150° C. The resulting film is hard and tough.

Example XXXVIII

About 7.5 parts of mercury perchlorate is added to 100 parts of polyether A. This mixture is cast on glass plates and baked at 150° C. The resulting film is hard and tough.

Example XXXIX

About 7.5 parts of aluminum persulfate is added to 100 parts of polyether A. This mixture is cast on glass plates and baked at 150° C. The resulting film is hard and tough.

Example XL

About 5 parts of magnesium fluoborate is added to 100 parts of vinyl cyclohexene dioxide and the mixture heated on glass plates to 160° C. The resulting film is hard and tough.

Example XLI

Examples XXII to XXXIX are repeated with the exception that the polyepoxide cure is polyallyl glycidyl ether having an epoxy value of 0.435 eq./100 g.

Example XLII

About 7.5 parts of tin sulfate is added to 100 parts of polyether A and baked on glass plates at 150° C. The resulting film is a hard coating.

Example XLIII

About 5 parts of zirconium borate is added to 100 parts of polyether A and baked on glass plates at 150° C. The resulting film is a hard coating.

Example XLIV

About 7.5 parts of cerium fluoborate is added to 100 parts of polyether A and baked on glass plates at 150° C. The resulting film is a hard coating.

Eample XLV

Example I(a) and VII to XXI are repeated with the exception that the cloth to be treated is rayon and wool. The resulting wool products have improved shrink resistance and the rayon products have improved crease resistance.

I claim as my invention:

1. A composition suitable for use in treating textiles comprising an aqueous medium containing a glycidyl polyether of a polyhydric alcohol having an epoxy equivalency between 1.1 and 3 and a molecular weight between 170 and 800, and from 0.1% to 30% by weight of the said glycidyl polyether of a curing agent consisting of a salt of (1) a metal of the group consisting of zinc, magnesium, copper, aluminum, nickel, cadmium, cerium, strontium, calcium, iron, cobalt, chromium, mercury, beryllium, zirconium, lead, tin, and selenium, and (2) an inorganic acid of the group consisting of sulfuric, sulfurous, persulfuric, fluoboric, fluoberyllic, nitric, boric, fluosilicic, phosphoric, phosphorous, perchloric, and chloric acid.

2. A composition as in claim 1 wherein the curing agent is zinc fluoborate.

3. A composition as in claim 1 wherein the glycidyl polyether is a glycidyl polyether of glycerol.

4. A composition suitable for use in treating textiles comprising an aqueous medium containing a halogen-containing polyether which is a mixture of ethers of polyhydric alcohols, the polyhydric alcohols having from 2 to 5 hydroxyl groups with at least two of the hydroxyl groups replaced in part by the group

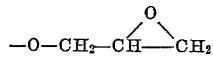

and in part by the group

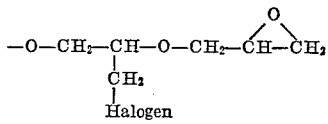

and any hydroxyl groups which are not so replaced being unchanged hydroxyl groups, and from 0.1% to 30% by weight of the said glycidyl polyether of a curing agent consisting of a salt of (1) a metal of the group consisting of zinc, magnesium, copper, aluminum, nickel, cadmium, cerium, strontium, calcium, iron, cobalt, chromium, mercury, beryllium, zirconium, lead, tin, and selenium, and (2) an inorganic acid of the group consisting of sulfuric, sulfurous, persulfuric, fluoboric, fluoberyllic, nitric, boric, fluosilicic, phosphoric, phosphorous, perchloric, and chloric acid.

5. A process for preparing shrink and crease proof textile material which comprises impregnating the textile material with an aqueous medium containing a glycidyl polyether of glycerol, and as the sole curing agent from 0.1% to 30% by weight of the glycidyl ether of a salt of (1) a metal of the group consisting of zinc, magnesium, copper, aluminum, nickel, cadmium, cerium, strontium, calcium, iron, cobalt, chromium, mercury, beryllium, zirconium, lead, tin and selenium, and (2) an inorganic acid of the group consisting of sulfuric, sulfurous, persulfuric, fluoboric, fluoberyllic, nitric, boric, fluosilicic, phosphoric, phosphorous, perchloric and chloric acid, and heating the treated fabric at a temperature between 30° C. and 200° C.

6. A process for preparing shrink and crease proof textile material which comprises impregnating the textile material with an aqueous medium containing a polyepoxide having more than one vic-epoxy group, and as the sole curing agent for the polyepoxide, from 0.1% to 30% by weight of the polyepoxide of zinc fluoborate.

7. A process for preparing shrink and crease proof textile fabrics which comprises impregnating the fabric with an acidic aqueous solution containing a polyglycidyl polyether of a polyhydric alcohol having an epoxy equivalency greater than 1.1 and a molecular weight between 200 and 800, a textile-softening agent, and a curing agent comprising from 0.1% to 30% by weight of polyglycidyl polyether of zinc fluoborate, and heating the treated fabric to a temperature between 100° C. and 190° C.

8. A process for preparing crease proof textile materials which comprises impregnating the textile material with an aqueous medium containing a glycidyl polyether of a polyhydric alcohol having an epoxy equivalency between 1.1 and 3 and a molecular weight between 170 and 800, and from 0.1% to 30% by weight of the said glycidyl polyether of a curing agent consisting of a salt of (1) a metal of the group consisting of zinc, magnesium, copper, aluminum, nickel, cadmium, cerium, strontium, calcium, iron, cobalt, chromium, mercury, beryllium, zirconium, lead, tin and selenium, and (2) an inorganic acid of the group consisting of sulfuric, sulfurous, persulfuric, fluoboric, fluoberyllic, nitric, boric, fluosilicic, phosphoric, phosphorous, perchloric, and chloric acid, and heating the treated textile material to a temperature between 30° C. and 200° C.

References Cited in the file of this patent

UNITED STATES PATENTS

| | | |
|---|---|---|
| 2,680,109 | Stevens et al. | June 1, 1954 |
| 2,682,515 | Naps | June 29, 1954 |
| 2,712,000 | Zech | June 28, 1955 |
| 2,723,924 | Mackinney | Nov. 15, 1955 |
| 2,794,010 | Jackson | May 28, 1957 |
| 2,803,609 | Schlenker | Aug. 20, 1957 |

FOREIGN PATENTS

| | | |
|---|---|---|
| 133,819 | Australia | Aug. 10, 1949 |